(12) United States Patent
Sharon et al.

(10) Patent No.: US 8,645,789 B2
(45) Date of Patent: Feb. 4, 2014

(54) MULTI-PHASE ECC ENCODING USING ALGEBRAIC CODES

(75) Inventors: Eran Sharon, Rishon Lezion (IL); Idan Alrod, Herzliya (IL); Simon Litsyn, Givat Shmuel (IL)

(73) Assignee: Sandisk Technologies Inc., Plano, TX (US)

( * ) Notice: Subject to any disclaimer, the term of this patent is extended or adjusted under 35 U.S.C. 154(b) by 98 days.

(21) Appl. No.: 13/335,534

(22) Filed: Dec. 22, 2011

(65) Prior Publication Data

US 2013/0166988 A1 Jun. 27, 2013

(51) Int. Cl.
 *H03M 13/00* (2006.01)
(52) U.S. Cl.
 USPC ............ 714/755; 714/784; 714/785; 714/801
(58) Field of Classification Search
 USPC .......................... 714/755, 781, 784, 785, 801
 See application file for complete search history.

(56) References Cited

U.S. PATENT DOCUMENTS

| | | | | |
|---|---|---|---|---|
| 7,079,826 B2* | 7/2006 | Muhammad et al. | ......... | 455/262 |
| 7,111,222 B2* | 9/2006 | Takagi et al. | ................. | 714/755 |
| 7,249,289 B2* | 7/2007 | Muranaka et al. | ............. | 714/48 |
| 7,512,867 B2* | 3/2009 | Ohira et al. | ................... | 714/786 |
| 7,823,043 B2 | 10/2010 | Lasser | | |
| 7,844,877 B2 | 11/2010 | Litsyn et al. | | |
| 8,010,879 B2* | 8/2011 | Katoh et al. | .................. | 714/781 |
| 8,312,348 B2* | 11/2012 | Yamaga | ......................... | 714/768 |
| 8,327,218 B2* | 12/2012 | Lee et al. | ...................... | 714/752 |
| 8,347,194 B2* | 1/2013 | No et al. | ........................ | 714/785 |
| 8,365,049 B2* | 1/2013 | Pribbernow et al. | .......... | 714/780 |
| 2007/0283214 A1 | 12/2007 | Lasser | | |

FOREIGN PATENT DOCUMENTS

| | | |
|---|---|---|
| WO | 2009028281 A1 | 3/2009 |
| WO | 2009041153 A1 | 4/2009 |
| WO | 2009104063 A1 | 8/2009 |
| WO | 2009107267 A1 | 9/2009 |

OTHER PUBLICATIONS

Wilkerson, Chris et al. "Reducing Cache Power with Low-Cost, Multi-bit Error-Correcting Codes," ISCA'10, Jun. 19-23, 2010, Saint-Malo, France, pp. 83-93.
"Error Detection and Correction," Wikipedia, http://en.wikipedia.org/wiki/Error_detection_and_correction, printed Dec. 22, 2011, 9 pages.
The International Search Report and Written Opinion mailed Apr. 24, 2013 in International Application No. PCT/US2012/070869, 12 pages.

* cited by examiner

*Primary Examiner* — Esaw Abraham
(74) *Attorney, Agent, or Firm* — Toler Law Group, PC

(57) ABSTRACT

A method includes a first encoding operation associated with a first algebraic error correcting code generating a first set of first parity bits corresponding to a first set of information bits and a second set of first parity bits corresponding to a second set of information bits. A second encoding operation associated with a second algebraic error correcting code generates a first set of second parity bits corresponding to the first set of information bits and a second set of second parity bits corresponding to the second set of information bits. A third encoding operation generates a set of joint parity bits. The first set of information bits, the second set of information bits, the first set of first parity bits, the second set of first parity bits, and the joint parity bits may be stored in a data storage device as a single codeword.

22 Claims, 5 Drawing Sheets

MULTI-PHASE ECC ENCODING USING ALGEBRAIC CODES

FIELD OF THE DISCLOSURE

The present disclosure is generally related to decoding error correction coding (ECC) data.

BACKGROUND

Non-volatile data storage devices, such as universal serial bus (USB) flash memory devices or removable storage cards, have allowed for increased portability of data and software applications. Flash memory devices can enhance data storage density by storing multiple bits in each flash memory cell. For example, Multi-Level Cell (MLC) flash memory devices provide increased storage density by storing 3 bits per cell, 4 bits per cell, or more. Although increasing the number of bits per cell and reducing device feature dimensions may increase a storage density of a memory device, a bit error rate of data stored at the memory device may also increase.

Error correction coding (ECC) is often used to correct errors that occur in data read from a memory device. Prior to storage, data may be encoded by an ECC encoder to generate redundant information (e.g. "parity bits") that may be stored with the data. For example, an ECC may be based on algebraic codes, such as a Hamming coding scheme, a Reed-Solomon (RS) encoding scheme, or a Bose Chaudhuri Hocquenghem (BCH) coding scheme, or based on iterative coding schemes, such as a Turbo Code coding scheme or a Low-Density Parity Check (LDPC) coding scheme.

An efficiency of an ECC scheme may be measured based on various aspects. For example, efficiency may be measured based on error correction capability as compared to redundancy, such as an amount of errors that can be corrected with a given amount of redundancy, or an amount of redundancy for correction of data subject to errors due to a particular error rate. Alternatively or additionally, efficiency may be measured at least partially based on complexity of an ECC engine (e.g. a size or cost of an ECC core), power consumption of the ECC engine, or decoding throughput and latency. For example, random read performance is improved with increases in throughput and decreases in latency, such as in solid-state drive (SSD) and memory card for mobile device applications.

SUMMARY

Algebraic codes are used in a multi-phase ECC scheme. Data may be encoded as multiple sets of information bits. For each set of information bits, a first code may be used to generate a first set of parity bits and a second code may be used to generate a second set of parity bits. The second set of parity bits for each of the multiple sets of information bits may be processed and encoded using a third code to generate a third set of parity bits to function as joint parity bits of the data. The joint parity bits may be encoded using a fourth code to generate a fourth set of parity bits to function as joint parity protection bits. The sets of information bits, the first parity bits, the joint parity bits, and the joint parity protection bits may be stored in a memory.

When a set of information bits is read from the memory, during a first decoding phase the corresponding first parity bits are used in a decoding attempt based on the first code. If decoding fails for a set of information bits during the first decoding phase, all of the information sets of the data may be decoded based on the first code and processed during a second decoding phase in conjunction with the joint parity bits to generate the second set of parity bits for the set of information that failed decoding in the first phase. Decoding using the second set of parity bits may be performed using the second code with improved error correction capability as compared to the first code.

Using algebraic codes enables construction of an error correction code as a concatenation of several shorter sub-codes (e.g. BCH sub-codes) joined together through a set of joint parity bits. The error correction code has high error correction capability while using a relatively low-complexity decoding engine as compared to implementations based on relatively high-complexity iterative decoders, such as implementations that use low-density parity check (LDPC) sub-codes concatenated to construct a long LDPC code.

DETAILED DESCRIPTION

Figure 1:
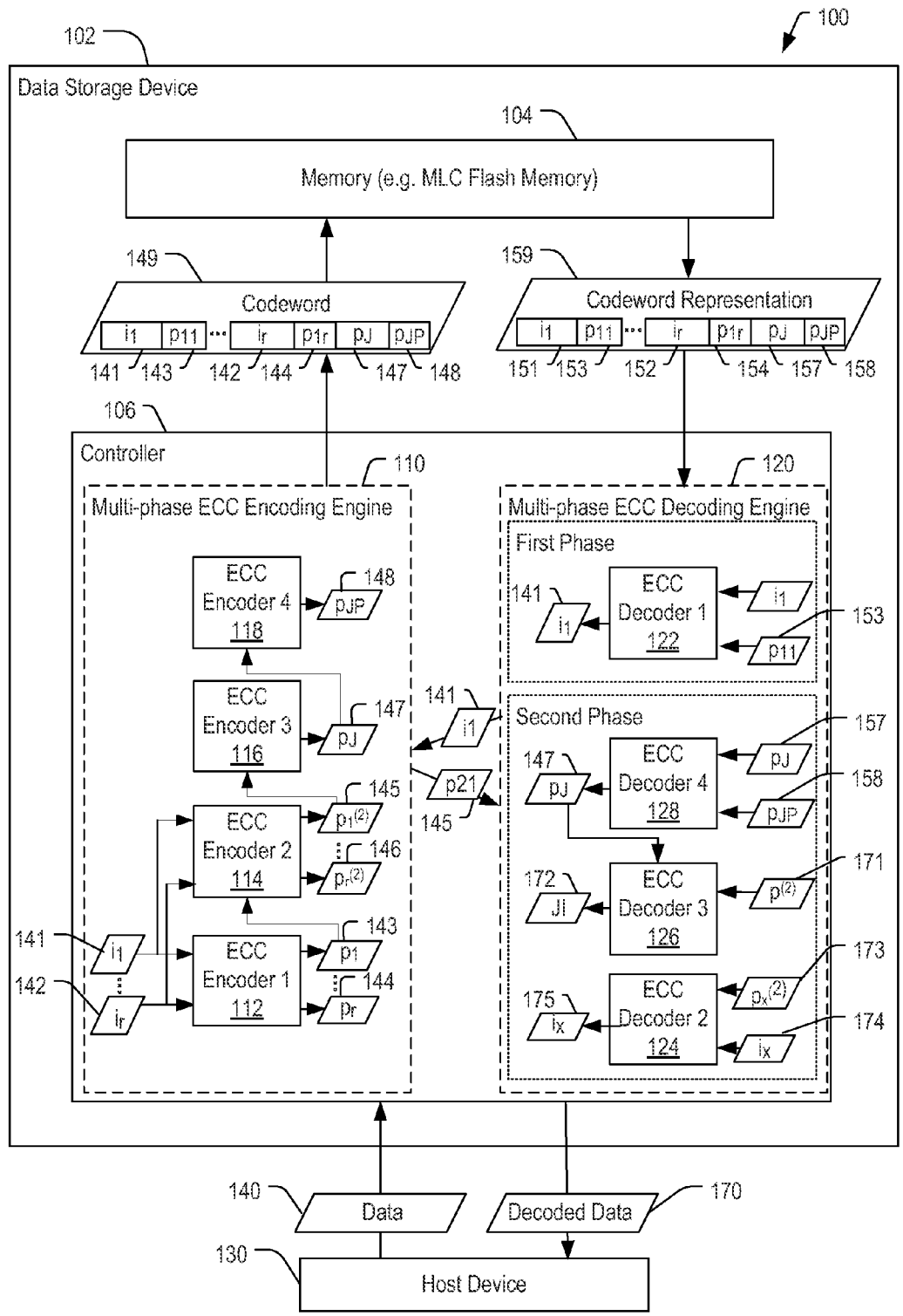
FIG. 1 is a diagram of a particular embodiment of a system that includes a data storage device configured to use multi-phase ECC decoding based on algebraic codes.

Referring to FIG. 1, a particular illustrative embodiment of a system 100 is depicted that includes a data storage device 102 configured to use multi-phase ECC decoding based on algebraic codes. The system 100 includes the data storage device 102 coupled to a host device 130. The data storage device 102 includes a memory 104 coupled to a controller 106. The controller 106 is configured to encode data for storage at the memory 104 to enable multi-phase ECC decoding based on algebraic codes. The controller 106 is also configured to decode the data read from the memory 104 using the multi-phase ECC decoding based on the algebraic codes.

The host device 130 may be configured to provide data to be stored at the memory 104 or to request data to be read from the memory 104. For example, the host device 130 may include a mobile telephone, a music or video player, a gaming console, an electronic book reader, a personal digital assistant (PDA), a computer, such as a laptop computer, a notebook computer, or a tablet, any other electronic device, or any combination thereof.

The data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be a solid state drive (SSD) or embedded memory in the host device 130, such as eMMC® (trademark of JEDEC Solid State Technology Association, Arlington, Va.) memory and eSD memory, as illustrative examples.

The memory 104 may include a flash memory. For example, the memory 104 may be a nonvolatile memory of a flash device, such as a NAND flash device, a NOR flash device, or any other type of flash device. The memory 104 includes multiple storage elements, such as memory cells of a multi-level cell (MLC) memory.

The controller 106 may be configured to receive memory access requests from the host device 130 while the data storage device 102 is operatively coupled to the host device 130. For example, the controller 106 may be configured to receive data 140 from the host device 130, encode the data 140 to generate a codeword 149, and store the codeword 149 at the memory 104. The controller 106 may also be configured to receive a request from the host device 130 to retrieve the data 140. In response, the controller 104 may be configured to read a codeword 159 from the memory 104, decode one or more requested portions of the codeword 159 to correct bit errors that may have occurred in the requested portions of the codeword 159, and provide decoded data 170 to the host device 130. The codeword 159 may be a representation of the codeword 149, i.e. the codeword 159 may differ from the codeword 149 due to one or more bit errors that may have occurred during storage at the memory 104.

The controller 106 includes a multi-phase ECC encoding engine 110 that is configured to encode data to enable multi-phase ECC decoding based on algebraic codes. The multi-phase ECC encoding engine 110 may include a first ECC encoder 112, a second ECC encoder 114, a third ECC encoder 116, and a fourth ECC encoder 118. The controller 106 includes a multi-phase ECC decoding engine 120 that is configured to decode data according to multi-phase ECC decoding based on the algebraic codes. The ECC decoding engine 120 may include a first ECC decoder 122, a second ECC decoder 124, a third ECC decoder 126, and a fourth ECC decoder 128.

The first ECC encoder 112 is configured to encode data according to a first algebraic code to generate a first set of parity bits. For example, the first algebraic code may be a Hamming code, a Reed-Solomon (RS) code, or a Bose Chaudhuri Hocquenghem (BCH) code. As used herein, an "algebraic code" may include any cyclic (or non-cyclic) code defined by a generator polynomial and excludes iterative coding schemes such as Turbo Codes and low-density parity check (LDPC). As a specific example, the first ECC encoder 112 may apply a polynomial generator function $g_1(x)$ of degree $m_1$ to input data to generate a set of $m_1$ first parity bits. The first set of parity bits may be used during a first decoding phase of data retrieved from the memory 104.

The second ECC encoder 114 is configured to encode data according to a second algebraic code to generate a second set of parity bits. The second algebraic code may be stronger (i.e. provide more error correction capability) than the first algebraic code. For example, the second ECC encoder 114 may apply a polynomial generator function $g(x)$ of degree $m_1+m_2$ to generate $m_1+m_2$ second parity bits. The second ECC encoder 114 may apply a polynomial generator function $g(x)=g1(x)\cdot g2(x)$ of degree $m_1+m_2$, where $g1(x)$ is the polynomial generator function of the first algebraic code (having degree $m_1$) and where $g2(x)$ is a polynomial generator function of degree $m_2$ to generate an additional $m_2$ parity bits. The second set of parity bits may be used during a second decoding phase of data retrieved from the memory 104.

The third ECC encoder 116 is configured to encode data according to a third algebraic code to generate a third set of parity bits. As described in further detail with respect to FIGS. 2-4, the third algebraic code may be applied to portions of multiple sets of joint information bits (based on an output of the second ECC encoder 114) to generate joint parity bits.

The fourth ECC encoder 118 is configured to encode data according to a fourth algebraic code to generate a fourth set of parity bits. The fourth algebraic code may be applied to the joint parity bits to form joint parity protecting bits.

The multi-phase ECC encoding engine 110 is configured to generate the codeword 149 by providing data, such as the data 140, to the first ECC encoder 112 as multiple sets of information bits ($i_1$ 141, ... $i_r$ 142) to generate a first set of parity bits (p) for each set of information bits (i.e. first sets of parity bits $p_1$ 143, ... $p_r$ 144, wherein each of the sets $p_i$ comprises m1 parity bits, respectively). The multi-phase ECC encoding engine 110 is configured to provide each set of information bits and a corresponding set of first parity bits to the second ECC encoder 114 to generate a second set of parity bits ($p^{(2)}$) for each set of information bits (i.e. second sets of parity bits $p_1^{(2)}$ 145, ... $p_r^{(2)}$ 146, respectively, wherein each of the $p_i^{(2)}$ comprises m1+m2 parity bits). The multi-phase ECC encoding engine 110 may be configured to generate a third set of codewords where the information bits of the third codeword are based on the second codewords (e.g. based on the parity bits of the second codewords, such as from portions of the parity bits of the second codewords, $p^{(2)}$) and to generate joint parity bits ($p_J$) 147 for the data 140 at the third ECC encoder 116. The multi-phase ECC encoding engine 110 may be configured to provide the joint parity bits 147 to the fourth ECC encoder 118 to generate joint parity protection bits ($p_{JP}$) 148 for the data 140.

The multi-phase ECC encoding engine 110 may be configured to generate the codeword 149 including the multiple sets of information bits 141-142, the multiple sets of first parity bits 143-144, the joint parity bits 147, and the joint parity protection bits 148. The sets of $p^{(2)}$ parity bits 145-146 may be discarded without being stored to the memory 104.

The first ECC decoder 122 is configured to decode data according to the first algebraic code used by the first ECC encoder 112. The first ECC decoder 122 is configured to receive a set of information bits and a corresponding first set of parity bits and to perform an ECC decode operation. If a number of bit errors in the information bits and in the first parity bits does not exceed an error correction capability of the first algebraic code, the first ECC decoder 122 generates a decoded set of information bits (i.e. an error-corrected version of the set of information bits). Otherwise, in response to a number of errors in the information bits and in the first parity bits exceeding an error correction capability of the first algebraic code, the first ECC decoder 112 generates a decoding failure indicator.

The second ECC decoder 124 is configured to decode data according to the second algebraic code used by the second ECC encoder 114. The second ECC decoder 124 is configured to receive a set of information bits and a corresponding second set of parity bits and to perform an ECC decode operation to generate an error-corrected version of the set of information bits.

The third ECC decoder 126 is configured to decode data according to the third algebraic code used by the third ECC encoder 126. As described in further detail with respect to FIGS. 2-4, the third algebraic code may be applied to portions of the set of third codewords to correct errors or erasures in the set of third codewords to generate an error-corrected version of the set of third codewords.

The fourth ECC decoder 128 is configured to decode data according to the fourth algebraic code used by the fourth ECC encoder 128. The fourth ECC decoder 128 is configured to receive joint parity bits and joint parity protection bits and to perform an ECC decode operation to correct errors in the joint parity bits to generate an error-corrected version of the joint parity bits.

The multi-phase ECC decoding engine 120 is configured to perform a first phase of ECC decoding by providing one or more requested sets of information bits and corresponding first parity bits (e.g. $i_1$ 151 and $p_1$ 153) from the retrieved codeword 159 to the first ECC decoder 122. If all requested sets of the information bits 151-152 from the retrieved codeword 159 are successfully decoded by the first ECC decoder 122, decode processing of the retrieved codeword 159 may end and the requested decoded data may be provided to the host device 130 as the decoded data 170.

Otherwise, when at least one requested set of information bits from the retrieved codeword 159 is not successfully decoded by the first ECC decoder 122, the multi-phase decoding engine 120 is configured to initiate decode processing of all sets of information bits 151-152 of the retrieved codeword 159. All sets of information bits 151-152 of the retrieved codeword 159 are therefore provided to the first ECC decoder 122 to attempt decoding using the corresponding first parity bits 153-154.

The multi-phase decoding engine 120 may be configured to initiate a second phase of decode processing by providing sets of information bits and first parity bits that are successfully decoded by the first ECC decoder 122 (e.g. $i_1$ 141) to the second ECC encoder 114 to generate $p^{(2)}$ parity bits for each successfully decoded set of information bits (e.g. $p_1^{(2)}$ 145).

The multi-phase decoding engine 120 may be configured to provide the joint parity bits 157 and the joint parity protection bits 158 to the fourth ECC decoder 128 to generate decoded joint parity bits 147. The decoded joint parity bits 147 and the generated sets of $p^{(2)}$ parity bits 171 for each of information bits that has been successfully decoded may be provided to the third ECC decoder 116 to decode a codeword from the set of third codewords. The multi-phase decoding engine 120 may be configured to process the decoded third codeword 172 to generate $p^{(2)}$ parity bits for each undecoded set of information bits. The decoded third codeword bits associated with an undecoded set of information bits (e.g. $W_1(x)$) may correspond to the set of second parity bits for the undecoded set of information bits (e.g. $p_1^{(2)}$) as being the second set of second parity bits divided by the first generator polynomial (e.g. $W_1(x)=p_1^{(2)}(x)/g_1(x)$), as described with respect to FIG. 2. The generated $p^{(2)}$ parity bits may be provided to the second ECC decoder 124 with undecoded information bits 174 for decoding using the second, higher-strength algebraic code to generate decoded information bits 175.

During operation, the data storage device 102 may receive the data 140 from the host device 130 while the data storage device 102 is operatively coupled to the host device 130. The controller 106 may provide the data 140 to the multi-phase ECC encoding engine 110 to generate the sets of first parity bits 143-144 at the first ECC encoder 112. The multi-phase ECC encoding engine 110 may provide the sets of information bits 141-142 and the sets of first parity bits 143-144 to generate the sets of second parity bits 145-146 at the second ECC encoder 114. The multi-phase ECC encoding engine 110 may provide the sets of second parity bits 145-146 to the third ECC encoder 116 to generate the set of joint parity bits 147. The multi-phase ECC encoding engine 110 may provide the set of joint parity bits 147 to the fourth ECC encoder 118 to generate the joint parity protection bits 148. The controller 106 may send the codeword 149 to the memory 104 for storage.

Not all of the bits generated by the encoding process are saved. To illustrate, $r \cdot m_2$ parity bits that are generated by the second encoder (e.g. $m_2$ parity bits for each one of r codewords) may not be stored as part of the codeword 149 and instead the joint parity bits 147 of the third encoder are stored, thus saving expensive storage space. The discarded bits may be reconstructed during decoding, if needed.

The data storage device 102 may receive a request for one or more portions of the data 140 from the host device 130 while the data storage device 102 is operatively coupled to the host device 130. The controller 106 may retrieve the codeword 159 from the memory and initiate first phase decoding of the requested sets of the information bits 151-152 using corresponding sets of the first parity bits 153-154. If all requested sets of the information bits 151-152 are successfully decoded in the first phase, the decoded data is provided to the host device 130.

If one or more sets of requested information bits fail to decode correctly during the first decoding phase, the multi-phase ECC decode engine 120 may initiate a second decoding phase that includes providing the joint parity protection bits 158 and the set of joint parity bits 157 to the fourth ECC encoder 128 to generate the error-corrected version of the set of joint parity bits 147. All sets of information bits of the codeword 159 that have not already been processed in the first phase are provided to the first ECC decoder 122, and the resulting error-corrected versions of the sets of information bits are encoded by the second ECC encoder 114 to generate sets of the second parity bits.

The sets of the second parity bits and the joint parity bits 147 are provided to the third ECC decoder 126 to generate decoded third codewords. The decoded third codewords may be processed to generate sets of second parity bits that are provided to the second ECC decoder 124 to generate decoded sets of information bits. The requested sets of information bits may be provided to the host device 130 as the decoded data 170.

Although the multi-phase ECC encoding engine 110 is illustrated as including the fourth ECC encoder 118 and the multi-phase ECC decoding engine 120 is illustrated as including the fourth ECC decoder 128, in other embodiments the fourth ECC encoder 118 and the fourth ECC decoder 128 may not be included, For example, the joint parity bits 147 may be stored in a portion of the memory 104 associated with a relatively low occurrence of errors, such as a single-level cell (SLC) portion of a flash memory. As another example, where the joint information bits 172 are the same as the second parity bits for each set of information bits (rather than a polynomial division remainder of the second parity bits), an impact of individual errors that may occur in the joint parity bits is reduced. As a result, a high probability of error correction may be achieved without using the joint parity protection bits 148.

FIG. 1 therefore provides an example of a system where several short sub-codes, such as BCH sub-codes, may be joined together through a set of joint parity bits to construct a long ECC code, having high error correction capability, while using a low-complexity decoding engine that is based on the short sub-codes. Moreover, usage of a multi-phase decoding scheme allows for random read support and low decoding latency. A first attempt may be performed to decode each sub-code separately. Based on a predicted error rate of data read from the memory 104, the short sub-codes may be designed to provide a relatively high probability of decoding success. As a result, data may be read from the memory 104, transferred to the controller 106, and a short sub-code decoded (e.g. $i_1$ 141 and $p_1$ 143 decoded at the first ECC decoder 122). In the relatively low-probability event that the first decoding attempt fails, other sub-codes that belong to the same ECC block (e.g. in the codeword 159) are also read from the memory 104, transferred to the controller 106, and decoded. If the other sub-codes decode successfully, then based on the joint parity bits and the decoding result of the other sub-codes, a second decoding attempt is done for the failing sub-code. The second decoding attempt uses an algebraic code having higher error correction capability (and therefore lower probability of failure) than the first attempt.

The notation C(n, k, t) is used herein to denote an error/erasure correction code, of length n and dimension k, that can correct t errors/erasures.

The vector notation $q=[q_0\ q_1\ q_2\ \ldots\ q_t]$ and its polynomial representation $q(x)=q_0+q_1 \cdot x+q_2 \cdot x^2+\ldots q_t \cdot x^i$ are used interchangeably.

The notation $$q(x) = \left\lfloor \frac{a(x)}{b(x)} \right\rfloor$$

is used to denote the quotient result of a polynomial division operation, such that $a(x)=q(x) \cdot b(x)+r(x)$, where $r(x)$ is the reminder polynomial and deg $r(x)<$deg $b(x)$ Upper case letters are used to represent temporary vectors/polynomials (e.g. Q or Q(x)) (i.e. used for intermediate computations during encoding/decoding). Lower case letters are used to represent input/output vectors of the encoder/decoder (e.g. q or q(x)).

The notation $\tilde{q}$ (or its polynomial representation $\tilde{q}(x)$) is used to denote a (possibly) corrupted version of the vector q (or its polynomial representation q(x)).

$g_1(x)$ denotes the degree $m_1$ generator polynomial of the error correction cyclic code $C_1(n_1=k+m_1,\ k,\ t_1)$. As an example, the first ECC encoder 112 and the first ECC decoder 122 of FIG. 1 may operate using $C_1$.

$g_2(x)$ denotes a degree $m_2$ polynomial, such that the degree $m_1+m_2$ polynomial $g(x)=g_1(x)\times g_2(x)$ is the generator polynomial of the error correction cyclic code $C_2(n_2=k+m_1+m_2,\ k,\ t_2)$, where $t_2>t_1$. As an example, the second ECC encoder 114 and the second ECC decoder 124 of FIG. 1 may operate using $C_2$.

r denotes the number of sub-codes that are concatenated.

$C_3(n_3=r+m_3,\ r,\ t_3)$ denotes an erasure correction code. For example, $C_3$ can be a single binary parity check code, such that $m_3=1$ bit, $n_3=r+1$ bits, and $t_3=1$ bit erasure. The erasure correction code $C_3$ is not necessarily binary. For example, $C_3$ can be a Reed-Solomon (RS) code over $GF(2^{\lceil log_2 n_3 \rceil})$ that can correct up to $t_3=m_3$ symbol erasures (where GF stands for a finite Galois Field). $n_3$ is the number of symbols in $GF(2^q)$, $q=\lceil\ log_2\ n_3\rceil$. The third ECC encoder 116 and the third ECC decoder 126 of FIG. 1 may operate using $C_3$.

$C_4(n_4=m_3 \times m_2+m_4,\ k_4=m_3 \times m_2,\ t_4)$ denotes an error correction code. The fourth ECC encoder 118 and the fourth ECC decoder 128 of FIG. 1 may operate using $C_4$.

A multi-phase ECC encoder may receive r vectors of k information bits (one vector per sub-code) $i_1, i_2, \ldots, i_r$ and may generate as output r vectors of $m_1$ parity bits (one vector per sub-code) $\underline{p}_1, \underline{p}_2, \ldots, \underline{p}_r$. The multi-phase ECC encoder may also generate a vector $\overline{w}$ of $m_3 \times m_2$ joint parity bits for all sub-codes and a vector $\underline{v}$ of $m_4$ parity bits for protecting the joint parity bits.

Encoding may be performed at the multi-phase ECC encoder by computing parity bits per sub-code ($\underline{p}_1, \underline{p}_2, \ldots, \underline{p}_r$) and computing joint parity bits ($\underline{w}$). The parity bits per sub-code ($\underline{p}_1, \underline{p}_2, \ldots, \underline{p}_r$) may be generated by, for each j=1, 2, \ldots, r, computing the quotient result Q(x) of the polynomial division:

$$Q(x) = \left\lfloor \frac{i_j(x) \cdot x^{m_1}}{g_1(x)} \right\rfloor.$$

The first parity, $p_j(x)$ (degree $m_1-1$ polynomial) or vector $\underline{p}_j$, may be computed as:

$$p_j(x)=i_j(x) \cdot x^{m_1}-Q(x) \cdot g_1(x)=i_j(x) \cdot x^{m_1} \bmod g_1(x).$$

Second parity bits $p_j^{(2)}(x)$ and/or joint information bits $W_j(x)$ (a degree $m_2-1$ polynomial, equivalent to $\overline{Wj}$) may be computed according to a quotient result U(x) of a polynomial division $$U(x) = \left\lfloor \frac{i_j(x) \cdot x^{m_1+m_2} - p_j(x) \cdot x^{m_2}}{g_1(x) \cdot g_2(x)} \right\rfloor, \text{ as}$$

$$W_j(x) = \frac{i_j(x) \cdot x^{m_1+m_2} - p_j(x) \cdot x^{m_2} - U(x) \cdot g_1(x) \cdot g_2(x)}{g_1(x)}$$

$$= Q(x) \cdot x^{m_2} - U(x) \cdot g_2(x)$$

Note that $W_j(x)$ can also be computed as:

$$p_j^{(2)}(x) = [i_j(x) \cdot x^{m_1} - p_j(x)] \cdot x^{m_2} \bmod g_1(x) \cdot g_2(x);$$

$$W_j(x) = \frac{p_j^{(2)}(x)}{g_1(x)}$$

Alternatively, $W_j(x)$ may be computed as:

$$W_j(x)=Q(x) \cdot x^{m_2} \bmod g_2(x)$$

Computing joint parity bits ($\underline{w}$) may be performed using code $C_3$ in order to compute the $m_3 \times m_2$ joint parity bits ($\underline{w}$) from the vectors $\overline{W}_j$ (j=1, 2, \ldots, r). The $\overline{W}_j$ vectors may be arranged as rows of a matrix and $m_3$ parity symbols may be computed for each column of r symbols in the matrix using code $C_3$, such as shown in FIG. 2.

Figure 2:
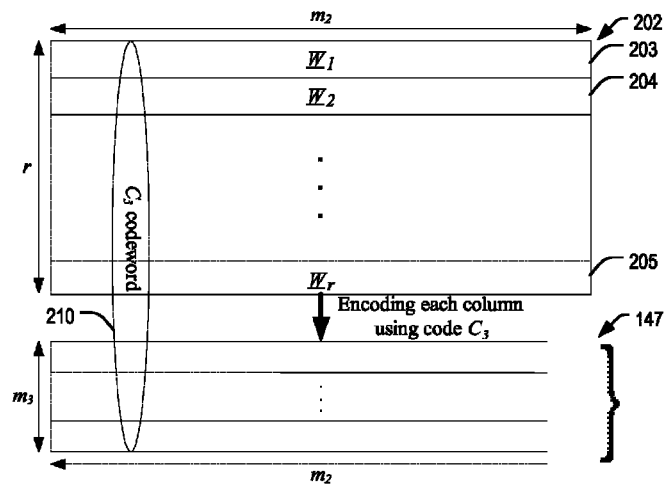
FIG. 2 is a diagram that illustrates a first embodiment of generation of joint parity bits to use with multi-phase ECC decoding based on algebraic codes.

FIG. 2 illustrates a particular embodiment of generation of joint parity bits to use with multi-phase ECC decoding based on algebraic codes. A set of joint information bits 202 is arranged as a matrix including r rows: $\overline{W}_1$ 203, $\overline{W}_2$ 204, \ldots $\overline{W}_r$ 205. As described above, each row $\overline{W}_j$ may correspond to the second set of parity bits $p_j^{(2)}$ divided by the generator polynomial $g_2(x)$ (where the second set of parity bits $p_j^{(2)}$ is based on the generator polynomial $g(x)=g_1(x) \cdot g_2(x)$). In an alternative embodiment, each row $\overline{W}_j$ may be the second set of parity bits $p_j^{(2)}$. A representative $\overline{C}_3$ codeword 210 includes one bit from each row of the set of joint information bits 202 and one parity bit from each row of the joint parity bits ($\underline{w}$) 147. By applying the $C_3$ code to each column of the set of joint information bits 202 (e.g. by encoding the joint information bits at the third ECC encoder 116 of FIG. 1), parity bits are generated that correspond to each column of the joint parity bits ($\underline{w}$) 147.

Figure 3:
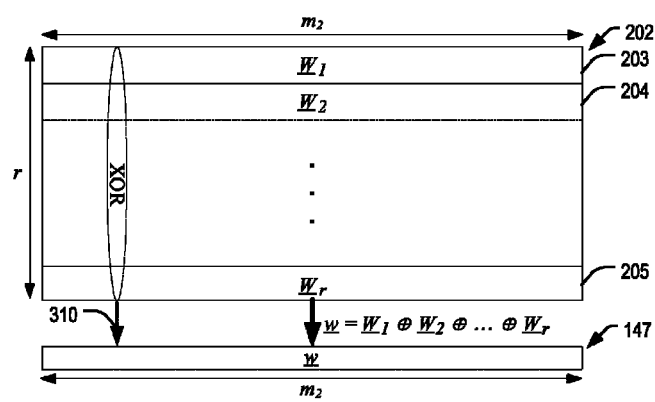
FIG. 3 is a diagram that illustrates a second embodiment of generation of joint parity bits to use with multi-phase ECC decoding based on algebraic codes.

FIG. 3 illustrates a particular embodiment of generation of joint parity bits to use with multi-phase ECC decoding based on algebraic codes where the code $C_3$ is a binary code, such as a single parity check code, that can correct a single erasure (that is, $C_3(r+1,r,1)$ over GF(2)). The set of joint information bits 202 is arranged as the matrix including the r rows: $\overline{W}_1$ 203, $\overline{W}_2$ 204, \ldots $\overline{W}_r$ 205. Applying the $C_3$ code (an exclusive- OR (XOR) operation 310) to bits of each column of the set of joint information bits 202 generates a corresponding parity bit of the joint parity bits (w) 147. Using the XOR operation 310 enables the joint parity bits (w) 147 to be generated using relatively low-complexity hardware and enables correction of a single erasure per column. As a result, if all but one of the r rows have been generated, the missing row can be reconstructed using the joint parity bits (w) 147).

Figure 4:
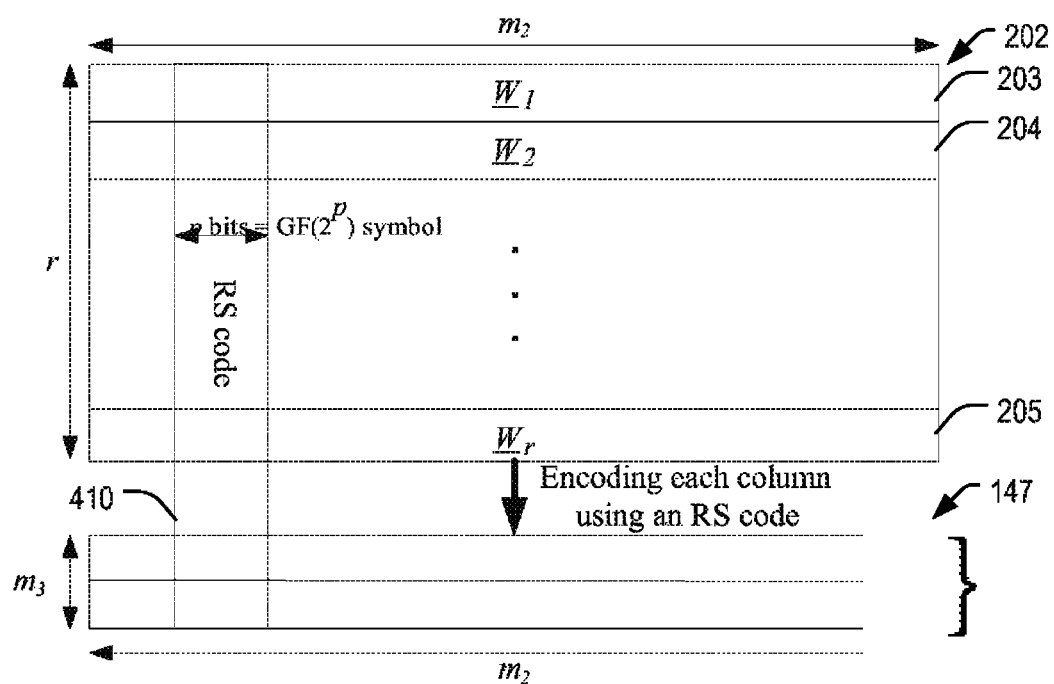
FIG. 4 is a diagram that illustrates a third embodiment of generation of joint parity bits to use with multi-phase ECC decoding based on algebraic codes.

FIG. 4 illustrates a particular embodiment of generation of joint parity bits to use with multi-phase ECC decoding based on algebraic codes where the code $C_3$ is a non-binary code. As illustrated, the code $C_3$ is a Reed-Solomon (RS) code over $GF(2^p)$ that can correct two erasures (that is $C_3(r+2, r, 2)$ over $GF(2^p)$) where $p=\lceil \log_2(r+m_3) \rceil$. A representative $C_3$ codeword 410 includes multiple bits (corresponding to a non-binary symbol) from each row of the set of joint information bits 202 and multiple parity bits (corresponding to a non-binary symbol) from each row of the joint parity bits (w) 147.

Although FIG. 4 illustrates each non-binary symbol of the codeword 410 is formed from bits of a single row of the set of joint information bits 202, in other embodiments, symbols of the codeword 410 may span multiple rows of the set of joint information bits 202. To illustrate, a single symbol may include one bit from the row $W_1$ 203 at one column and another bit from the row $W_2$ 204 at another column. By using multi-bit symbols spanning multiple rows of the set of joint information bits 202, additional tolerance to first-phase decoding failures may be provided, as described in further detail with respect to second-phase decoding.

Computing parity bits for protecting the joint parity bits (v) (e.g. the joint parity protection bits 148 of FIG. 1) may be performed using code $C_4(n_4=m_3\times m_2+m_4, k_4=m_3\times m_2, t_4)$ to compute $m_4$ parity bits (v) for protecting the $m_3\times m_2$ joint parity bits w. For example, the fourth ECC encoder 118 of FIG. 1 may encode the joint parity bits 147 to generate the joint parity protection bits 148.

A total number of bits that are stored to the memory may be $r\times k+r\times m_1+m_2\times m_3+m_4$, corresponding to storage of $i_1, i_2, \ldots, i_r, p_1, p_2, \ldots, p_r, w,$ and v (e.g. storage of the codeword 149 of FIG. 1 including $i_1 \ldots i_r$ 141-142, $p_1 \ldots p_r$ 143-144, $p_J$ 147, and $p_{JP}$ 148). To illustrate, storing r sets of k information bits (i) results in $r\times k$ bits stored. Storing r sets of first parity bits (p), where each set of first parity bits includes $m_1$ bits, results in $r\times m_1$ bits stored. Storing $m_3$ rows of the joint parity bits (w), where each row has $m_2$ bits, results in $m_2\times m_3$ bits stored. Storing the joint parity protection bits (v) results in $m_4$ bits stored.

Decoding may be performed in a first phase and, if any requested sub-codes are not correctly decoded in the first phase, second phase decoding may be performed. In the first phase decoding, in order to retrieve the j'th sub-code information bits $i_j$, the (possibly corrupted) bits $\tilde{i}_j$ and $\tilde{p}_j$ are read from the memory and a code $C_1$ decoder is used to decode $i_j$ from $\tilde{i}_j$ and $\tilde{p}_j$. Decoding is successful if the memory introduced $t_1$ or fewer errors to the $n_1$ bits of each $C_1$ codeword. For example, the first ECC decoder 122 of FIG. 1 operates on the possibly corrupted information bits $i_1$ 151 and the possibly corrupted first parity bits $p_1$ to generate the information bits $i_1$ 141.

Although $C_1$ may be a cyclic code, in some embodiments $C_1$ may be non-cyclic. Note that $c_j(x)=i_j(x)\cdot x^{m_1}-p_j(x)=Q(x)\cdot g_1(x)$ is a codeword of the cyclic code $C_1$ as it is divisible by $g_1(x)$. A special case of a cyclic code is a BCH code (when $g_1(x)$ is constructed as the least common multiple of the minimal polynomials of the element $\alpha^0, \alpha^1, \alpha^2, \ldots, \alpha^{2t_1}$ of $GF(2^{\lceil \log_2 n_1 \rceil})$ where $\alpha$ is a primitive element of the Galois field $GF(2^{\lceil \log_2 n_1 \rceil})$). In order to compute the least common multiple of $\alpha^0, \alpha^1, \alpha^2, \ldots, \alpha^{2t_1}$ minimal polynomials of the elements $\alpha^0, \alpha^1, \alpha^3, \ldots, \alpha^{2\cdot t_1-1}$ in $GF(2^{\lceil \log_2 n_1 \rceil})$ may be used. In some embodiments, $C_1$ may be any code that is defined as a multiplication of a generator polynomial. Thus, C1 may be a non-cyclic code, and may be a shortened BCH code or shortened RS code, as illustrative examples.

Second phase sub-code decoding using the sub-code parity and the joint parity may be performed if up to $t_3$ sub-codes failed to decode during the first phase. The second phase decoding may include reading from memory the (possibly corrupted) joint parity bits $\tilde{w}$ and the (possibly corrupted) parity bits $\tilde{v}$ that protect the joint parity bits $\tilde{w}$. A code $C_4$ decoder (e.g. the fourth ECC decoder 128 of FIG. 1) is used to recover an error-free version of the joint parity bits w using $\tilde{w}$ and $\tilde{v}$. Decoding of the joint parity bits $\tilde{w}$ is successful if the memory introduced $t_4$ or fewer errors to the $n_4$ bits of $C_4$ (i.e. $\tilde{w}$ and $\tilde{v}$ have fewer than $t_4$ errors).

For each sub-code j that was successfully decoded in the first phase decoding, $i_j$ and $p_j$ may be used to compute $$U(x) = \left\lfloor \frac{i_j(x)\cdot x^{m_1+m_2} - p_j(x)\cdot x^{m_2}}{g_1(x)\cdot g_2(x)} \right\rfloor.$$

The contribution of sub-code j to the third codeword $C_3$ may be generated as:

$$W_j(x) = \frac{i_j(x)\cdot x^{m_1+m_2} - p_j(x)\cdot x^{m_2} - U(x)\cdot g_1(x)\cdot g_2(x)}{g_1(x)}.$$

Alternatively, $W_j(x)$ may be generated as:

$$W_j(x) = \frac{[i_j(x)\cdot x^{m_1} - p_j(x)]\cdot x^{m_2} \bmod g_1(x)\cdot g_2(x)}{g_1(x)}.$$

Note that $g_1(x)$ and $g_2(x)$ may be known in the decoder since the code definition is assumed to be known. Also note that in a particular implementation case, computing $W_j(x)$ may be performed by computing:

$$Q(x) = \left\lfloor \frac{i_j(x)\cdot x^{m_1}}{g_1(x)} \right\rfloor,$$

followed by $W_j(x)=Q(x)\cdot x^{m_2} \bmod g_2(x)$.

The code $C_3$ erasure decoder may be used to recover $W_j$ of each failing sub-code j. The erasure decoder will successfully recover $W_j$ of each of the failing sub-codes if at most $t_3$ sub-codes failed to decode during phase 1.

Note that in case $C_3$ is a non-binary code, e.g. including symbols over $GF(2^q)$, $q=\lceil \log_2 n_3 \rceil$ and in each such symbol more than one sub-code takes part, $t_3$ may be less than r and decoding may still succeed if, in each of the 'r' sub-codes, there are less than $t_2$ errors in the $k+m_1$ bits corresponding to code $C_1$. For example, if q=4, r=8, $t_3$=2 (RS correcting two erasures or one error), and $m_3$=2 (symbol), all 8 sub-codes could fail decoding ($t_3$=2<r=8) and the second phase decoding scheme will still recover the information bits if, in each of the 8 sub-codes, there are less than $t_2$ errors in the $k+m_1$ bits corresponding to code $C_1$.

For each sub-code j that failed in the first decoding phase, the corrupted $C_2$ codeword may be generated as the polynomial:

$$\tilde{c}_j(x) = \tilde{i}_j(x) \cdot x^{m_1+m_2} - \tilde{p}_j(x) \cdot x^{m_2} - W_j(x) \cdot g_1(x) \qquad 5$$

The code $C_2$ decoder (e.g. the second ECC decoder 124 of FIG. 1) may be used to decode $\tilde{i}_j$ from $\tilde{c}_j(x)$. Decoding is successful if the memory introduced $t_2$ or fewer errors to the read bits $\tilde{i}_j$ and $\tilde{p}_j$ (i.e. second phase decoding succeeds if $\tilde{i}_j$ and $\tilde{p}_j$ have $t_2$ or fewer combined errors).

Note that $c_j(x) = [i_j(x) \cdot x^{m_1} - p_j(x)] \cdot x^{m_2} - W_j(x) \cdot g_1(x) = U(x) \cdot g_1(x) \cdot g_2(x)$ is a codeword of the cyclic code $C_2$ as it is divisible by $g(x) = g_1(x) \cdot g_2(x)$. A special case of a cyclic code is a BCH code (when $g(x) = g_1(x) \cdot g_2(x)$ is constructed as the least common multiple of the minimal polynomials of the roots $\alpha^0, \alpha^1, \alpha^2, \ldots, \alpha^{2t_2}$ where $\alpha$ is a primitive element of the Galois field $GF(2^{\lceil \log_2 n_2 \rceil})$. Note that $C_2$ can correspond to a shortened BCH or RS code and does not have to be a cyclic code.

Multi-phase decoding using algebraic codes can provide a significant reduction in complexity and decoding latency while maintaining roughly the same error correction capability for a given amount of redundancy as compared to conventional ECC encoding. Several examples are provided in Table 1. In the examples of Table 1, the multi-phase codeword (e.g. codeword 149 of FIG. 1) fits into 932B and provides a block error rate $<10^{-10}$ per 8 KB blocks. As reference, a conventional 122 b/2 KB BCH may be used.

TABLE 1

| Scheme | Number of sub-codes (r) | Sub-code size (k) [KB] | Correction capability (BER) [%] | Normalized complexity | Normalized latency |
|---|---|---|---|---|---|
| Reference | 1 | 2 | 0.35 | 1 | 1 |
| Example 1 | 8 | 1 | 0.375 | 0.65 | 0.5 |
| Example 2 | 4 | 1 | 0.35 | 0.61 | 0.5 |
| Example 3 | 2 | 1 | 0.325 | 0.59 | 0.5 |
| Example 4 | 8 | 0.5 | 0.315 | 0.38 | 0.25 |
| Example 5 | 8 | 0.5 | 0.3 | 0.35 | 0.25 |

Reference: conventional BCH: $k_{ref} = 2$ KB, $t_{ref} = 122$

Example 1: r=8, k=1 KB, $t_1$=64, $t_2$=79, $t_3$=1, $t_4$=8 ($C_1, C_2, C_4$ are BCH codes, $C_3$ is a single parity check code)

Example 2: r=4, k=1 KB, $t_1$=62, $t_2$=76, $t_3$=1, $t_4$=7 ($C_1, C_2, C_4$ are BCH codes, $C_3$ is a single parity check code)

Example 3: r=2, k=1 KB, $t_1$=56, $t_2$=72, $t_3$=1, $t_4$=8 ($C_1, C_2, C_4$ are BCH codes, $C_3$ is a single parity check code)

Example 4: r=8, k=0.5 KB, $t_1$=31, $t_2$=46, $t_3$=2, $t_4$=11 ($C_1, C_2, C_4$ are BCH codes, $C_3$ is an RS code over $GF(16)$)

Example 5: r=8, k=0.5 KB, $t_1$=34, $t_2$=45, $t_3$=1, $t_4$=6 ($C_1, C_2, C_4$ are BCH codes, $C_3$ is a single parity check code)

The complexity improvement of the multi-phase ECC using algebraic codes when codes $C_1, C_2$ and $C_4$ are BCH codes and code $C_3$ is either a single parity-check code or an RS code, as compared to a conventional BCH coding scheme of length $n_{ref}$ and correction capability $t_{ref}$ may be given by:

$$\text{Complexity ratio} = \frac{t_2 \cdot \lceil \log_2 n_2 \rceil + t_3 \cdot \lceil \log_2 n_3 \rceil + t_4 \cdot \lceil \log_2 n_4 \rceil}{t_{ref} \cdot \lceil \log_2 n_{ref} \rceil}$$

Latency improvement of the multi-phase ECC using algebraic codes, compared to a conventional BCH coding scheme of length $n_{ref}$ may be given by:

$$\text{Latency ratio} = \frac{n_1}{n_{ref}}$$

The latency ratio may be based on the decoding latency being mainly determined by the first decoding stage because the probability of a sub-code to fail during the first decoding phase may be small (e.g. less than $10^{-5}$).

Figure 5:
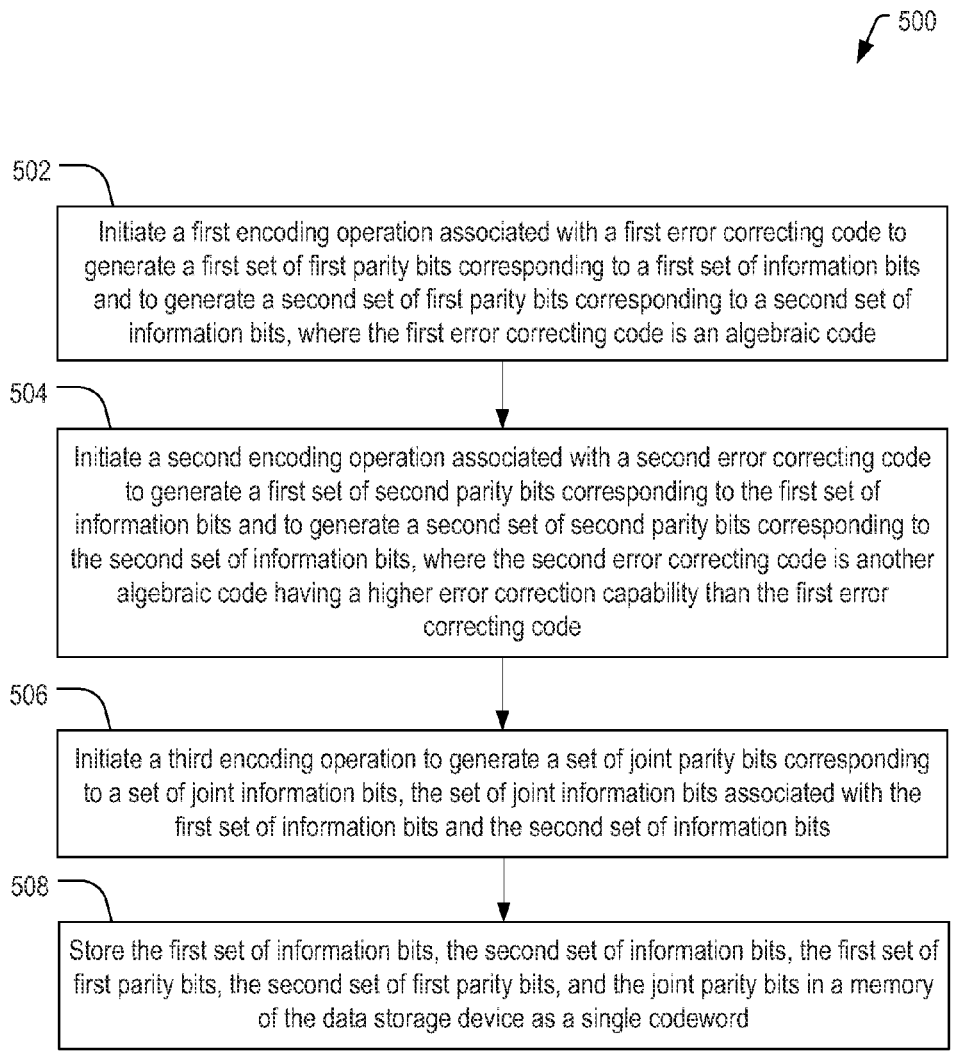
FIG. 5 is a flow diagram of a particular embodiment of a method of multi-phase ECC encoding based on algebraic codes.

Referring to FIG. 5, a flow chart of a particular embodiment of a method 500 of encoding data is depicted. The method 500 may be performed at a data storage device, such as the data storage device 102 of FIG. 1. A first encoding operation associated with a first error correcting code may be initiated to generate a first set of first parity bits corresponding to a first set of information bits and to generate a second set of first parity bits corresponding to a second set of information bits, at 502. The first error correcting code is an algebraic code. For example, the first encoding operation may be initiated at the first ECC encoder 112 of FIG. 1 by providing the first set of information bits to an encoding input of the first ECC encoder 112 and sending a signal to a control input of the first ECC encoder 112 to cause the first ECC encoder to read the first set of information bits at the encoding input and to perform the first encoding operation on the first set of information bits.

A second encoding operation associated with a second error correcting code is initiated to generate a first set of second parity bits corresponding to the first set of information bits and to generate a second set of second parity bits corresponding to the second set of information bits, at 504. The second error correcting code is another algebraic code having a higher error correction capability than the first error correcting code. For example, the second encoding operation may be initiated at the second ECC encoder 114 of FIG. 1 by providing the first set of information bits to an encoding input of the second ECC encoder 114 and sending a signal to a control input of the second ECC encoder 114 to cause the second ECC encoder 114 to read the first set of information bits at the encoding input and to perform the second encoding operation on the first set of information bits.

A third encoding operation is initiated to generate a set of joint parity bits corresponding to a set of joint information bits, at 506. The set of joint information bits is associated with the first set of information bits and the second set of information bits. For example, the first error correcting code may correspond to a first generator polynomial $g_1(x)$, and the set of joint information bits may include the first set of second parity bits divided by the first generator polynomial (e.g. $W_1(x) = p_1^{(2)}(x)/g_1(x)$) and may include the second set of second parity bits divided by the first generator polynomial ($W_2(x) = p_2^{(2)}(x)/g_1(x)$). The third encoding operation may be initiated at the third ECC encoder 116 of FIG. 1 by generating the set of joint information bits, providing the set of joint information bits to an encoding input of the third ECC encoder 116, and sending a signal to a control input of the third ECC encoder 116 to cause the third ECC encoder 116 to read the set of joint information bits at the encoding input and to perform the third encoding operation on the set of joint information bits. As an example, the set of joint information bits may be arranged in a matrix, such as illustrated in FIGS. 2-4, and provided to the encoding input as a sequence of columns (or sets of columns) of the matrix. For example, the third encoding operation may include a single parity check code that can correct a single erasure, such as described with respect to FIG. 3. As another example, the third encoding operation may include a non-binary algebraic code, such as described with respect to FIG. 4.

The method 500 also includes storing the first set of information bits, the second set of information bits, the first set of first parity bits, the second set of first parity bits, and the joint parity bits in a memory of the data storage device as a single codeword, at 508. For example, the single codeword may be the codeword 149 of FIG. 1.

The method 500 may also include initiating a fourth encoding operation to generate a set of joint parity protection bits corresponding to the joint parity bits, such as by the fourth ECC encoder 128 of FIG. 1. The single codeword may further include the set of joint parity protection bits. The fourth encoding operation may be initiated by providing the set of joint parity bits to an encoding input of the fourth ECC encoder 118 and sending a signal to a control input of the fourth ECC encoder 118 to cause the fourth ECC encoder 118 to read the set of joint parity bits at the encoding input and to perform the fourth encoding operation on the set of joint parity bits.

By encoding information to enable multi-phase ECC decoding based on algebraic codes, a first decoding phase may be performed that decodes short sub-codes with reduced latency as compared to BCH codes having comparable error correction capacity as the multi-phase ECC decoding scheme. A second decoding phase may provide stronger ECC protection based on longer codes with reduced memory storage requirements as compared to BCH codes having comparable error correction capability. ECC using algebraic codes may reduce decoder complexity and decoding latency as compared to iterative decoding schemes such as Turbo Codes or LDPC.

Figure 6:
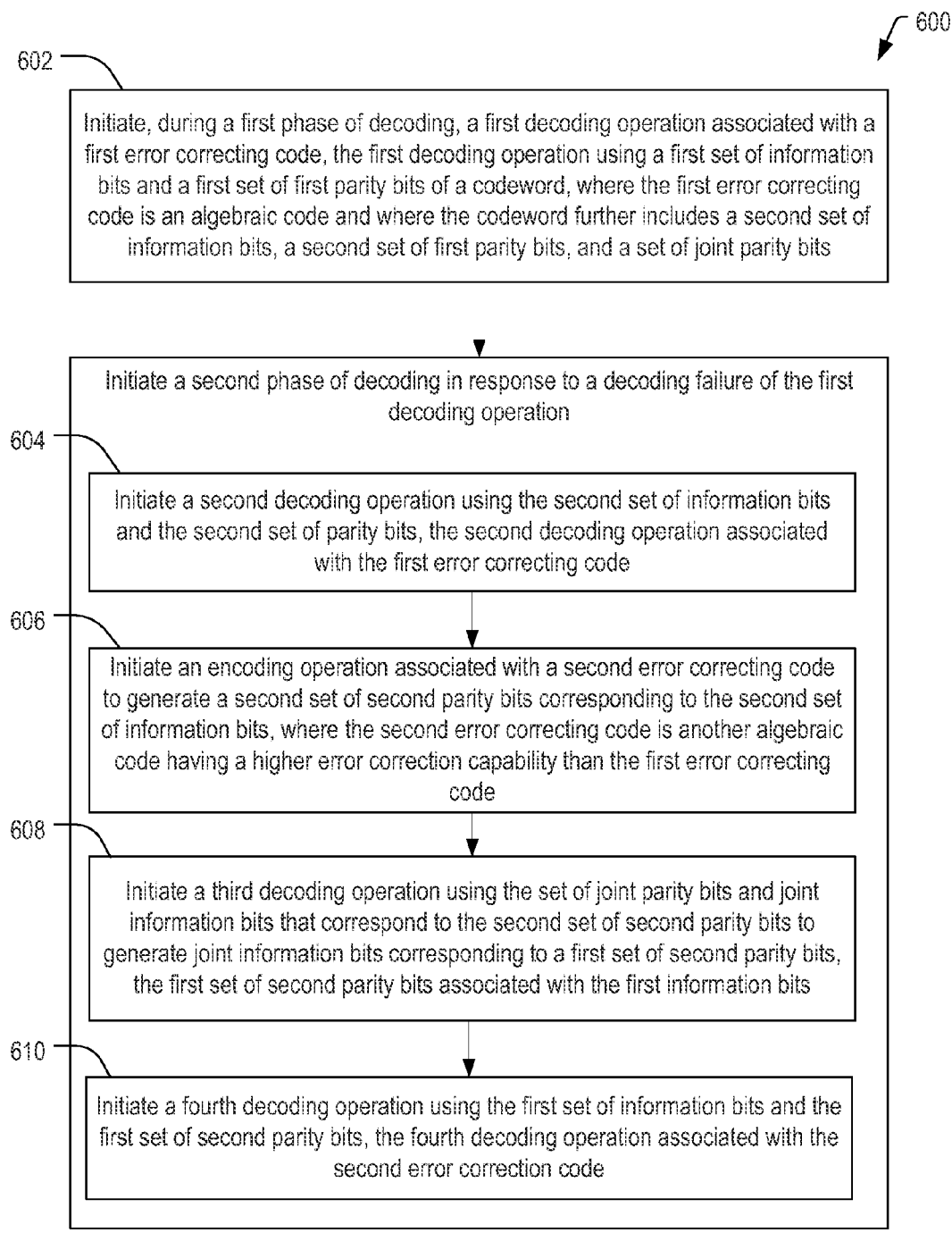
FIG. 6 is a flow diagram of a particular embodiment of a method of multi-phase ECC decoding based on algebraic codes.

Referring to FIG. 6, a flow chart of a particular embodiment of a method 600 of decoding data is depicted. The method 600 may be performed at a data storage device, such as the data storage device 102 of FIG. 1.

During a first phase of decoding, a first decoding operation associated with a first error correcting code is initiated, at 602. The first decoding operation uses a first set of information bits and a first set of first parity bits of a codeword. The first error correcting code is an algebraic code. For example, the first decoding operation may be initiated at the first ECC decoder 122 of FIG. 1 by providing the first set of information bits and the first set of parity bits to a decoding input of the first ECC decoder 122 and sending a signal to a control input of the first ECC decoder 122 to cause the first ECC decoder 122 to read the first set of information bits and the first set of parity bits at the decoding input and to perform the first decoding operation. The codeword further includes a second set of information bits, a second set of first parity bits, and a set of joint parity bits, such as the codeword 159 of FIG. 1.

A second phase of decoding is initiated in response to a decoding failure of the first decoding operation, at 604. The second phase includes initiating a second decoding operation using the second set of information bits and the second set of parity bits, at 606. The second decoding operation is associated with the first error correcting code. For example, the second decoding operation may be initiated at the first ECC decoder 122 of FIG. 1 by providing the second set of information bits and the second set of parity bits to a decoding input of the first ECC decoder 122 and sending a signal to a control input of the first ECC decoder 122 to cause the first ECC decoder 122 to read the second set of information bits and the second set of parity bits at the decoding input and to perform the second decoding operation.

The second phase includes initiating an encoding operation associated with a second error correcting code to generate a second set of second parity bits corresponding to the second set of information bits, at 606. The second error correcting code is another algebraic code having a higher error correction capability than the first error correcting code. For example, the encoding operation may be initiated at the second ECC encoder 114 of FIG. 1 by providing the second set of information bits to an encoding input of the second ECC encoder 114 and sending a signal to a control input of the second ECC encoder 114 to cause the second ECC encoder 114 to read the second set of information bits at the encoding input and to perform the encoding operation on the second set of information bits.

The second phase includes initiating a third decoding operation using the set of joint parity bits and joint information bits that correspond to the second set of second parity bits to generate joint information bits corresponding to a first set of second parity bits, at 608. The first set of second parity bits is associated with the first information bits. For example, the first error correcting code may correspond to a first generator polynomial, such as $g_1(x)$. The joint information bits (e.g. $W_2(x)$) corresponding to the second set of second parity bits may include the second set of second parity bits divided by the first generator polynomial (e.g. $p_2^{(2)}(x)/g_1(x)$). As an example, the third decoding operation may be initiated at the third ECC decoder 126 of FIG. 1 by generating the set of joint information bits including joint information bits corresponding to the second set of parity bits (but excluding joint information bits corresponding to the first set of information bits), providing the set of joint information bits and the joint parity bits to a decoding input of the third ECC decoder 126, and sending a signal to a control input of the third ECC decoder 126 to cause the third ECC decoder 126 to read the set of joint information bits and the set of joint parity bits at the decoding input and to perform the third decoding operation on the set of joint information bits and the set of joint parity bits.

The second phase also includes initiating a fourth decoding operation using the first set of information bits and the first set of second parity bits, at 610. The fourth decoding operation is associated with the second error correction code. For example, the fourth decoding operation may be initiated at the second ECC decoder 124 of FIG. 1 by providing the first set of information bits and the first set of second parity bits to a decoding input of the second ECC decoder 124 and sending a signal to a control input of the second ECC decoder 124 to cause the second ECC decoder 124 to read the first set of information bits and the first set of second parity bits at the decoding input and to perform the fourth decoding operation.

In some embodiments, the codeword further includes a set of joint parity protection bits, and the second phase includes initiating a joint parity decoding operation using the set of joint parity bits and the set of joint parity protection bits to correct errors in the set of joint parity bits prior to initiating the third decoding operation. For example, the joint parity decoding operation may be performed at the fourth ECC decoder 128 of FIG. 1. As an example, the joint parity decoding operation may be based on a single parity check code that can correct a single erasure, such as described with respect to FIG. 3. As another example, the joint parity decoding operation may be based on a non-binary algebraic code, such as described with respect to FIG. 4.

By decoding using multi-phase ECC decoding based on algebraic codes, a first decoding phase may be performed that decodes short sub-codes with reduced latency and complexity as compared to BCH codes having comparable error correction capacity as the multi-phase ECC decoding scheme. A second decoding phase may provide stronger ECC protection based on longer codes with reduced memory storage requirements as compared to BCH codes having comparable error correction capability. ECC using algebraic codes may reduce decoder complexity and decoding latency as compared to iterative decoding schemes such as Turbo Codes or LDPC.

Although various components depicted herein are illustrated as block components and described in general terms, such components may include one or more microprocessors, state machines, or other circuits configured to enable a data storage device, such as the data storage device 102 of FIG. 1, to perform the particular functions attributed to such components, or any combination thereof. For example, one or both of the multi-phase ECC encoding engine 110 and the multi-phase ECC decoding engine 120 of FIG. 1 may represent physical components, such as processors, state machines, logic circuits, or other structures to enable encoding and decoding of data according to a multi-phase ECC scheme using algebraic codes.

One or both of the multi-phase ECC encoding engine 110 and the multi-phase ECC decoding engine 120 of FIG. 1 may be implemented using a microprocessor or microcontroller. In a particular embodiment, the multi-phase ECC decoding engine 120 includes a processor executing instructions that are stored at the memory 104. Alternatively, or in addition, executable instructions may be stored at a separate memory location that is not part of the memory 104, such as at a read-only memory (ROM).

In a particular embodiment, the data storage device 102 may be a portable device configured to be selectively coupled to one or more external devices. For example, the data storage device 102 may be a removable device such as a universal serial bus (USB) flash drive or removable memory card. However, in other embodiments, the data storage device 102 may be attached or embedded within one or more host devices, such as within a housing of a portable communication device. For example, the data storage device 102 may be within a packaged apparatus, such as a wireless telephone, a personal digital assistant (PDA), a gaming device or console, a portable navigation device, a computer, or other device that uses internal non-volatile memory. In a particular embodiment, the data storage device 102 includes a non-volatile memory, such as a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of encoding data, the method comprising:
at a data storage device, performing:
   initiating a first encoding operation associated with a first error correcting code to generate a first set of first parity bits corresponding to a first set of information bits and to generate a second set of first parity bits corresponding to a second set of information bits, wherein the first error correcting code is an algebraic code;
   initiating a second encoding operation associated with a second error correcting code to generate a first set of second parity bits corresponding to the first set of information bits and to generate a second set of second parity bits corresponding to the second set of information bits, wherein the second error correcting code is another algebraic code having a higher error correction capability than the first error correcting code;
   initiating a third encoding operation to generate a set of joint parity bits corresponding to a set of joint information bits, the set of joint information bits associated with the first set of information bits and the second set of information bits; and
   storing the first set of information bits, the second set of information bits, the first set of first parity bits, the second set of first parity bits, and the joint parity bits in a memory of the data storage device as a single codeword.

2. The method of claim 1, further comprising initiating a fourth encoding operation to generate a set of joint parity protection bits corresponding to the joint parity bits, wherein the single codeword further includes the set of joint parity protection bits.

3. The method of claim 1, wherein the third encoding operation includes a single parity check code that corrects a single erasure.

4. The method of claim 1, wherein the third encoding operation includes a non-binary algebraic code.

5. The method of claim 1, wherein the first error correcting code corresponds to a first generator polynomial and wherein the set of joint information bits includes the first set of second parity bits divided by the first generator polynomial and includes the second set of second parity bits divided by the first generator polynomial.

6. A method of decoding data, the method comprising:
at a data storage device, performing:
   initiating, during a first phase of decoding, a first decoding operation associated with a first error correcting code, the first decoding operation using a first set of information bits and a first set of first parity bits of a codeword, wherein the first error correcting code is an algebraic code and wherein the codeword further includes a second set of information bits, a second set of first parity bits, and a set of joint parity bits; and
   initiating a second phase of decoding in response to a decoding failure of the first decoding operation, the second phase including:
      initiating a second decoding operation using the second set of information bits and the second set of first parity bits, the second decoding operation associated with the first error correcting code;
      initiating an encoding operation associated with a second error correcting code to generate a second set of second parity bits corresponding to the second set of information bits, wherein the second error correcting code is another algebraic code having a higher error correction capability than the first error correcting code;

initiating a third decoding operation using the set of joint parity bits and joint information bits that correspond to the second set of second parity bits to generate joint information bits corresponding to a first set of second parity bits, the first set of second parity bits associated with the first information bits; and initiating a fourth decoding operation using the first set of information bits and the first set of second parity bits, the fourth decoding operation associated with the second error correction code.

7. The method of claim 6, wherein the codeword further includes a set of joint parity protection bits, and further comprising initiating a joint parity decoding operation using the set of joint parity bits and the set of joint parity protection bits to correct errors in the set of joint parity bits prior to initiating the third decoding operation.

8. The method of claim 7, wherein the joint parity decoding operation is based on a single parity check code that corrects a single erasure.

9. The method of claim 7, wherein the joint parity decoding operation is based on a non-binary algebraic code.

10. The method of claim 6, wherein the first error correcting code corresponds to a first generator polynomial and wherein the joint information bits corresponding to the second set of second parity bits include the second set of second parity bits divided by the first generator polynomial.

11. A data storage device, comprising:
a memory; and
a multi-phase error correction coding (ECC) encoder including:
a first encoder associated with a first error correcting code and configured to generate a first set of first parity bits corresponding to a first set of information bits and to generate a second set of first parity bits corresponding to a second set of information bits, wherein the first error correcting code is an algebraic code;
a second encoder associated with a second error correcting code and configured to generate a first set of second parity bits corresponding to the first set of information bits and to generate a second set of second parity bits corresponding to the second set of information bits, wherein the second error correcting code is another algebraic code having a higher error correction capability than the first error correcting code; and
a third encoder configured to generate a set of joint parity bits corresponding to a set of joint information bits, the set of joint information bits associated with the first set of information bits and the second set of information bits,
wherein the multi-phase ECC encoder is configured to generate a codeword including the first set of information bits, the second set of information bits, the first set of first parity bits, the second set of first parity bits, and the joint parity bits to be stored in the memory.

12. The data storage device of claim 11, wherein the multi-phase ECC encoder further includes a fourth ECC encoder configured to generate a set of joint parity protection bits corresponding to the joint parity bits and wherein the multi-phase ECC encoder is configured to include the set of joint parity protection bits in the codeword.

13. The data storage device of claim 11, wherein the third encoder is configured to use a single parity check code that corrects a single erasure per codeword.

14. The data storage device of claim 11, wherein the third encoder is configured to use a non-binary algebraic code.

15. The data storage device of claim 11, wherein the first error correcting code corresponds to a first generator polynomial and wherein the set of joint information bits includes the first set of second parity bits divided by the first generator polynomial and includes the second set of second parity bits divided by the first generator polynomial.

16. A data storage device, comprising:
a memory; and
a multi-phase error correction coding (ECC) decoder including:
a first decoder associated with a first error correcting code and configured to receive a first set of information bits and a first set of first parity bits of a codeword that is stored at the memory, wherein the first error correcting code is a first algebraic code and wherein the codeword further includes a second set of information bits, a second set of first parity bits, and a set of joint parity bits;
a second decoder associated with a second error correcting code and configured to receive the first set of information bits and a first set of second parity bits and to generate an error-corrected version of the first set of information bits, wherein the second error correcting code is another algebraic code having a higher error correction capability than the first error correcting code; and
a third decoder configured to receive the set of joint parity bits and a set of joint information bits and to generate an error-corrected version of the set of joint information bits, wherein the set of joint information bits is associated with the first set of information bits and the second set of information bits,
wherein the multi-phase ECC decoder is configured to perform a first phase decoding of the first set of information bits using the first decoder and, in response to a decode failure during the first phase decoding, to perform a second phase decoding that includes decoding the second set of information bits using the first decoder, generating a second set of second parity bits corresponding to the second set of information bits, decoding joint information bits corresponding to the first set of information bits using the third decoder, and decoding the first set of information bits using the second decoder, wherein the first set of second parity bits provided to the second decoder corresponds to the decoded joint information bits corresponding to the first set of information bits.

17. The data storage device of claim 16, wherein the codeword further includes a set of joint parity protection bits, and further comprising a fourth decoder configured to perform a joint parity decoding operation to use the set of joint parity bits and the set of joint parity protection bits to generate an error-corrected version of the set of joint parity bits.

18. The data storage device of claim 17, wherein the joint parity decoding operation is based on a single parity check code that corrects a single erasure per codeword.

19. The data storage device of claim 17, wherein the joint parity decoding operation is based on a non-binary algebraic code.

20. The data storage device of claim 16, wherein the first error correcting code corresponds to a first generator polynomial and wherein the joint information bits corresponding to the first set of information bits include the first set of second parity bits divided by the first generator polynomial.

21. The method of claim 1, wherein a subset of bits of a codeword of the second error correcting code constitutes a codeword of the first error correcting code.

22. The method of claim 6, wherein a subset of bits of a codeword of the second error correcting code constitutes a codeword of the first error correcting code.

* * * * *